Jan. 29, 1957  G. W. FRAZIER  2,779,097
DOUGHNUT HOLE DOUGH REMOVER
Filed April 12, 1954
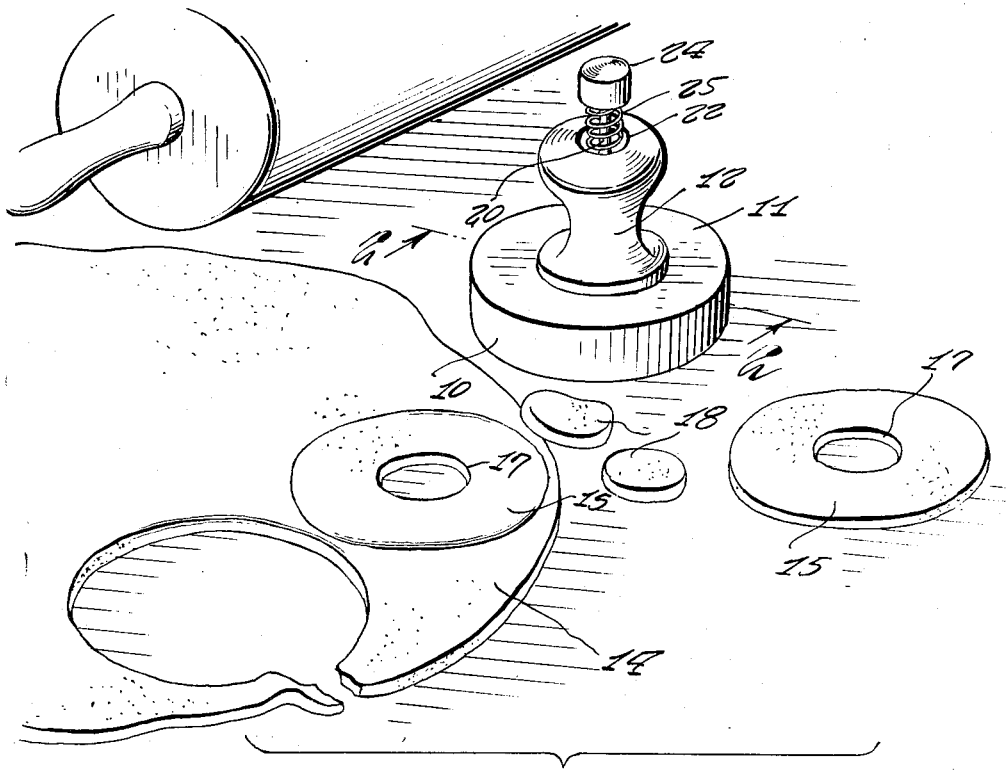
Fig. 1
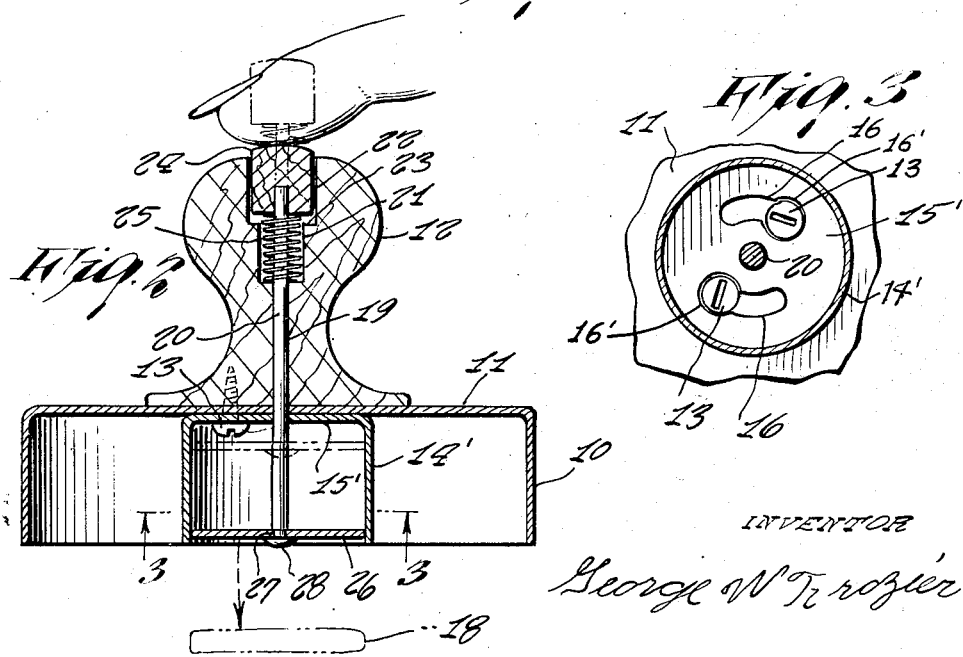
Fig. 2
Fig. 3
INVENTOR
George W. Frazier

United States Patent Office 2,779,097
Patented Jan. 29, 1957

2,779,097

DOUGHNUT HOLE DOUGH REMOVER

George W. Frazier, Warren, Ohio

Application April 12, 1954, Serial No. 422,422

1 Claim. (Cl. 30—130)

This invention relates to doughnut hole dough removers.

It is an object of the present invention to provide an improved doughnut hole dough remover incorporating a plunger and plunger plate adapted to be pressed downwardly to remove the center of the doughnut.

It is another object of the present invention to provide a doughnut hole dough remover of the above type wherein the plunger and plunger plate are normally retained in an inoperative position by spring means contained within the handle of the tool.

It is still another object of the present invention to provide a doughnut hole dough remover of the above type wherein the plunger plate is removable to provide access to the conventional removable center piece.

Other objects of the present invention are to provide a doughnut hole dough remover bearing the above objects in mind which is of simple construction, has a minimum number of parts, durable, convenient to use and efficient in operation.

For other objects and a better understanding of the invention reference may be had to the following detailed description taken in connection with the accompanying drawing, in which:

Figure 1 is a perspective view of the invention and showing the products resulting from the same;

Fig. 2 is a vertical sectional view taken along the line 2—2 of Fig. 1; and

Fig. 3 is a transverse sectional view taken along the line 3—3 of Fig. 2.

Referring now more in detail to the drawing, 10 represents a cylindrical hollow member open at the bottom and provided with a flat top wall 11 on which is mounted a wooden handle 12 by means of wood screws 13, substantially as illustrated. When pressed downwardly (Fig. 1) on the dough 14, the member 10 will cut out the discs 15 to be used in forming the doughnuts.

A removable cylindrical center piece 14' having an upper wall 15' and open at the bottom is provided, the top wall 15' being provided with a pair of arcuate slots 16 (Fig. 3) having enlarged ends 16' and within which ride the screws 13. Upon rotating the center piece 14', the heads of screws 13 will move to the enlarged ends 16' of slots 16, permitting the center piece to be removed.

The open lower end of the center piece 14' determines the central opening 17 of the doughnut 15, removing the central portions 18 (Fig. 1).

In the practice of my invention, the handle 12 is provided with a narrow central bore 19 within which is slidably positioned a plunger rod 20, the upper end of the plunger rod 20 extending upwardly into an enlarged bore 21 which in turn extends upwardly into a further enlarged bore 22, providing a shoulder 23. A knob 24 adapted to fit within the bore 22 and to abut shoulder 23 is suitably secured to the upper end of the plunger rod 20, a spring 25 sleeving the rod 20 intermediate the knob 24 and the lower end of the bore 21, whereby to normally urge the knob and plunger rod into the raised position of Fig. 1. A plunger plate 26 adapted to slide freely within the center piece 14' is provided with a central opening 27 by means of which it is removably secured to the lower end of the rod 20 by means of a screw 28. When the knob 24 is pressed downwardly, as shown in Fig. 2, the plunger plate 26 will move to the bottom of the center piece 14' to forcibly eject the central portion 18 and to provide the proper shape for the doughnut.

Since the plunger plate 26 is removable, it provides ready access to the center piece 14' whereby to remove the latter, if desired.

The size and shape of the handle 12 will be determined by the manufacturer, as will the size and shape of the dough cutter 10.

While various changes may be made in the detail construction, it shall be understood that such changes shall be within the spirit and scope of the present invention as defined by the appended claim.

Having thus set forth and disclosed the nature of my invention, what is claimed is:

A doughnut hole dough remover comprising a hollow, substantially cylindrical member open at the bottom and having a flat top wall, an upstanding handle positioned on the center of said top wall, a pair of oppositely disposed fastening means having enlarged heads and passing upwardly through said top wall and into said handle, said enlarged heads being freely spaced from the undersurface of said top wall, a hollow, substantially cylindrical center piece open at the bottom and having a top wall, said center piece top wall having oppositely disposed arcuate slots with enlarged ends adapted to receive said enlarged heads freely therethrough, said fastening means passing through said arcuate slots whereby to removably secure said center piece top wall to the undersurface of said first top wall, the lower edges of said hollow member and center piece lying in the same plane, said handle having a central narrow bore extending upwardly from said top walls, said handle above said narrow bore having a first enlarged bore, said handle above said first enlarged bore having a second enlarged bore extending through the upper end of said handle and of greater diameter than said first enlarged bore whereby to provide a shoulder, a plunger rod slidable within said bores, said hollow member and center piece top walls having aligned openings receiving said plunger rod therethrough, an external manually operable knob secured to the upper end of said plunger rod, said knob being adapted to move vertically within said second enlarged bore and to abut said shoulder, a spiral spring sleeving said plunger rod within said first enlarged bore with the upper end thereof abutting said knob, the other end thereof abutting the lower end of said first enlarged bore, a plunger plate slidable within said center piece, and removable fastening means securing said plunger plate to the lower end of said plunger whereby to permit removal of said center piece upon removal of said plunger plate and rotation of said center piece top wall.

References Cited in the file of this patent

UNITED STATES PATENTS

| | | |
|---|---|---|
| 1,088,070 | Haines | Feb. 24, 1914 |
| 1,892,779 | Cole | Jan. 3, 1933 |
| 2,314,401 | Johnson | Mar. 23, 1943 |
| 2,499,309 | Harris | Feb. 28, 1950 |